United States Patent

Kobayashi et al.

[11] Patent Number: 5,132,891
[45] Date of Patent: Jul. 21, 1992

[54] POWER SUPPLY APPARATUS

[75] Inventors: Masaki Kobayashi; Masaki Mori, both of Machida; Norishige Morimoto, Tokyo, all of Japan

[73] Assignee: International Business Machines Corporation, Armonk, N.Y.

[21] Appl. No.: 722,462

[22] Filed: Jun. 27, 1991

[30] Foreign Application Priority Data

Aug. 3, 1990 [JP] Japan .................... 2-205273

[51] Int. Cl.⁵ .......................................... H02M 3/335
[52] U.S. Cl. ........................................ 363/21; 363/97; 358/190
[58] Field of Search ................ 363/20, 21, 97, 124, 363/131; 358/190; 315/411

[56] References Cited

U.S. PATENT DOCUMENTS

| | | | |
|---|---|---|---|
| 3,706,023 | 12/1972 | Yamada et al. | 363/21 |
| 4,115,814 | 9/1978 | Kosaka et al. | 358/243 |
| 4,516,168 | 5/1985 | Hicks | 358/190 |
| 4,524,411 | 6/1985 | Willis | 363/21 |
| 4,692,852 | 9/1987 | Hoover | 363/21 |
| 4,999,708 | 3/1991 | Aoki et al. | 358/153 |

Primary Examiner—Peter S. Wong
Attorney, Agent, or Firm—Joscelyn G. Cockburn

[57] ABSTRACT

A power supply includes a switch mode power regulator coupled to a control circuit arrangement which synchronizes signals from a controlled oscillator with horizontal synchronous pulse trains to provide switching pulses for controlling the power regulator. Preferably, the horizontal synchronous pulse trains are at frequencies suited to drive a multimode character display.

8 Claims, 9 Drawing Sheets

| K | x2 | x3 | x4 | x5 | x6 | x7 | x8 |
|---|---|---|---|---|---|---|---|
| 31 KHz | 62 KHz | 93 KHz | 124 KHz | 155 KHz | 186 KHz | 217 KHz | 248 KHz |
| 38 KHz | 76 KHz | 114 KHz | 152 KHz | 190 KHz | 228 KHz | 266 KHz | 304 KHz |
| 48 KHz | 96 KHz | 144 KHz | 192 KHz | 240 KHz | 288 KHz | 336 KHz | 386 KHz |
| 64 KHz | 128 KHz | 192 KHz | 256 KHz | 320 KHz | 384 KHz | 448 KHz | 512 KHz |

TABLE 6A ($F_L$)

| | | | | | | | | |
|---|---|---|---|---|---|---|---|---|
| 31KHz | FS | 57KHz | 88KHz | 119KHz | 150KHz | 181KHz | 212KHz | 243KHz |
| | FL | 62KHz | 93KHz | 124KHz | 155KHz | 186KHz | 217KHz | 248KHz |
| | FE | 67KHz | 98KHz | 129KHz | 160KHz | 191KHz | 222KHz | 253KHz |
| 38KHz | FS | 71KHz | 109KHz | 147KHz | 185KHz | 223KHz | — | — |
| | FL | 76KHz | 114KHz | 152KHz | 190KHz | 228KHz | — | — |
| | FE | 81KHz | 119KHz | 157KHz | 195KHz | 233KHz | — | — |
| 48KHz | FS | 91KHz | 139KHz | 187KHz | 235KHz | — | — | — |
| | FL | 96KHz | 144KHz | 192KHz | 240KHz | — | — | — |
| | FE | 101KHz | 149KHz | 197KHz | 245KHz | — | — | — |
| 64KHz | FS | 123KHz | 187KHz | 251KHz | — | — | — | — |
| | FL | 128KHz | 192KHz | 256KHz | — | — | — | — |
| | FE | 133KHz | 197KHz | 261KHz | — | — | — | — |

TABLE 6B

FIG. 7

| RANGE 1 | − 5 6 K H z |
|---|---|
| RANGE 2 | − 4 2 K H z |
| RANGE 3 | − 2 5 K H z |
| RANGE 4 | − 2 2 K H z |
| RANGE 5 | − 2 0 K H z |
| RANGE 6 | − 1 8 K H z |
| RANGE 7 | − 1 7 K H z |
| RANGE 8 | − 2 7 K H z |
| RANGE 9 | + 4 K H z |
| RANGE 10 | − 7 0 K H z |
| RANGE 11 | − 2 9 K H z |
| RANGE 12 | − 1 8 K H z |

TABLE 6C

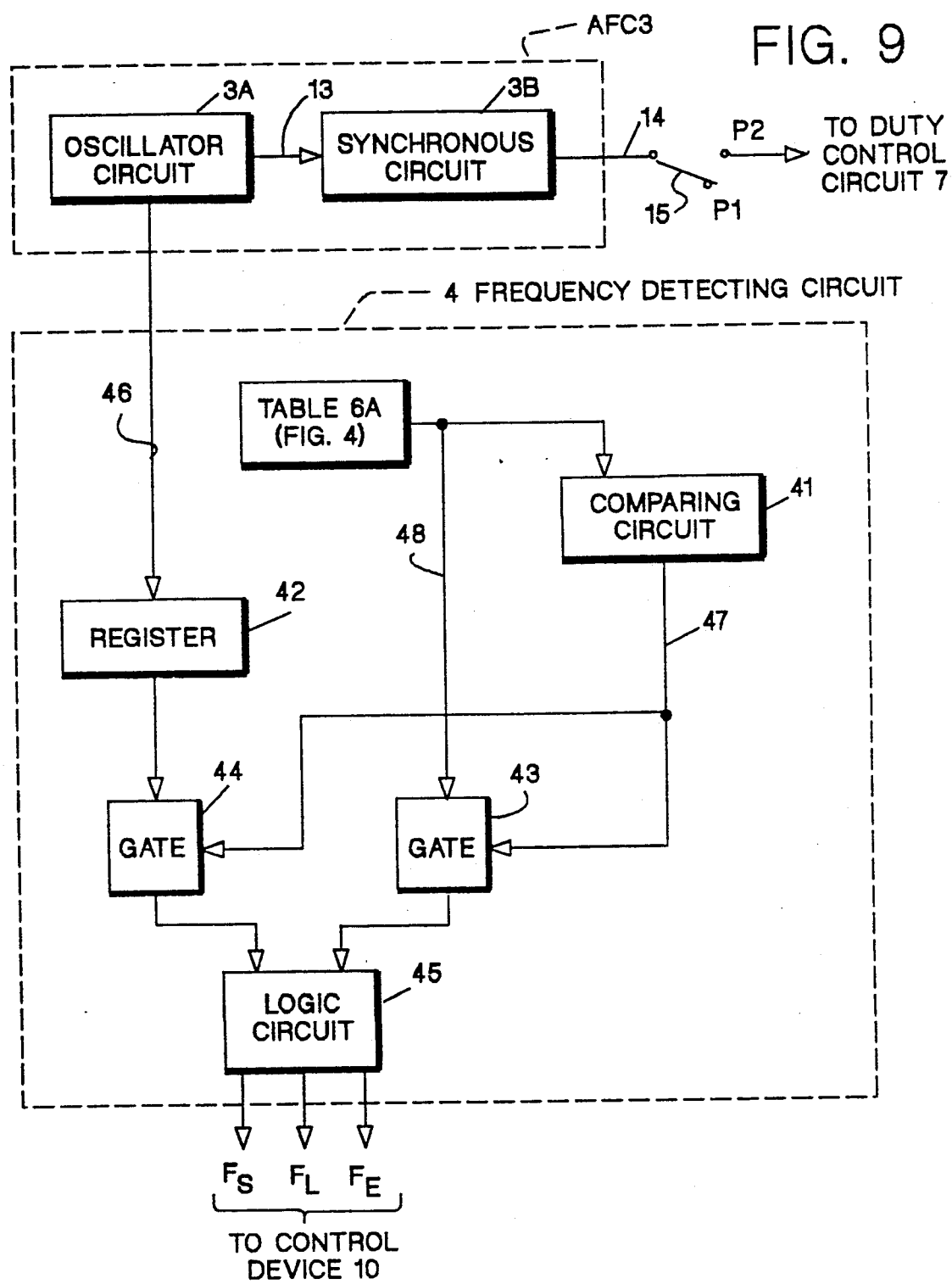

POWER SUPPLY APPARATUS

BACKGROUND OF THE INVENTION

A. Technical Field

The invention relates to a power supply apparatus of switching regulator type for a multi-frequency display system wherein plural horizontal synchronous pulse trains of different frequencies are used to support multi-display mode.

B. Prior Art and Problem

A switching regulator called as a switching mode power supply device has been used as a stabilized DC power supply for a CRT display device, a personal computer, a printer of a display workstation. The power supply device is mounted within a space in the CRT display device. Problems encountered in mounting the switching mode power supply device within the CRT display device are a jitter or a beating noise appeared on a CRT display surface due to an interference between a frequency of horizontal deflection pulses and a switching frequency of the switching regulator, and an unstability of a deflection magnetic field of the CRT display device caused by a leaked magnetic flux from a transformer of the power supply device. First approach for solving the problems was to magnetically separate the horizontal deflection circuit from the power supply by a shield. Second approach was to synchronize the horizontal deflection frequency with the switching frequency, as shown in "Switch mode power supply for CRT display," IBM Technical Disclosure Bulletin, Vol. 29, No. 9, February 1987, pp. 3921–3922, and "Switched power supply synchronized to display", IBM Technical Disclosure Bulletin, Vol. 29, No. 11, April 1987, pp. 4948–4949. In the former article, the switch mode power supply is normally run at a multiple of horizontal scan frequency. In the latter article, the switch mode power supply operates at halt the horizontal scan rate. Japanese patent application 63-294727 discloses a power supply device in which inputs of first and second switching regulators are commonly connected to DC bulk voltage output of a rectifying and smoothing circuit, and the second switching regulator operates at a switching frequency which is N times as large as or 1/N times as small as the switching frequency of the first switching regulator (N is integer larger than 1).

A multi-frequency type CRT display device has recently been marketed which has plural display modes of different horizontal synchronous frequencies, for example 31 KHz, 48 KHz, etc. to support various character display modes. In most of the multi-frequency type display devices, the horizontal synchronous frequencies and the switching frequency of the power supply device are independent from each other, and the shield for magnetically isolating both the circuits is used. In a recent display terminal device, the switching frequency of the power supply is designed to the horizontal synchronous frequency or its multiples. Actually, the multiple is used to realize a high efficiency and a reduced size of the power supply. In the case that the horizontal synchronous frequencies, e.g. 31 KHz and 48 KHz, are used, a power supply device is used which has the switching frequencies 93 KHz (=31 KHz×3) and 144 KHz (=48 KHz×3). That is, the power supply device must be designed to cover the wide range of 51 KHz (=144−93 KHz). Generally, typical circuit parameters such as core size of a switching transformer, switching speed range of a rectifying diode, capacitance and size of a smoothing capacitor, and design of heat reduction of circuit components are selected in accordance with the switching frequency or operating frequency of the switching regulator to design the switching mode power supply device.

In the design of the power supply device covering the wide frequency range 53 KHz, it was very difficult to select the above key design factors to optimum values all over the operational frequency range.

SUMMARY OF THE INVENTION

Power supply apparatus in accordance with the present invention comprises:

first means for selectively generating at least two horizontal synchronous pulse trains of different frequencies;

second means connected to said first means for generating one of first switching pulse train a frequency of which is N times as large as the frequency of one horizontal synchronous pulse train (N is a positive integer) and second switching pulse train a frequency of which is M times as larger as the frequency of the other horizontal synchronous pulse train (M is a positive integer), with said N and M being selected to provide the narrowest switching frequency range; and power supply means of switching regulator type connected to said second means, which operates in a switching frequency range defined by said first and second switching pulse trains.

In the power supply apparatus in accordance with the present invention, said first means is a display control circuit which selectively generates first horizontal synchronous pulse train of first frequency and second horizontal synchronous pulse train of second frequency.

In the power supply apparatus in accordance with the present invention, said second means includes an oscillator circuit for generating sawtooth waveform of a predetermined frequency, and a synchronous circuit receiving said sawtooth waveform and one of said first and second horizontal synchronous pulse train to modify said predetermined frequency to frequency which is N times as large as the frequency of first horizontal synchronous pulse train or frequency which is M times as large as the frequency of the second horizontal synchronous pulse train.

Power supply apparatus in accordance with the present invention comprises:

first means for selectively generating one of plural horizontal synchronous pulse trains of different frequencies;

frequency decision means for responding to information which indicates said frequencies of plural horizontal synchronous pulse trains, to select the broadest frequency range into which all the plural horizontal synchronous pulse trains can be synchronized, and to decide a basic frequency included in said narrowest frequency range;

second means operating at said basic frequency and responding to one of said frequencies of plural horizontal synchronous pulse trains to generate one of plural switching pulse trains which are equal to multiples of said frequencies of plural horizontal synchronous pulse trains, respectively; and power supply means of switching regulator type connected to said second means, which operates in a switching frequency range defined by said frequencies equal to said multiples.

In the power supply apparatus in accordance with the present invention, said frequency decision means includes an oscillator circuit varying a frequency of sawtooth waveform, a synchronous circuit connected to said oscillator circuit and receiving one of said plural horizontal synchronous pulse trains of different frequencies, and a frequency detecting circuit connected to said oscillator circuit and said synchronous circuit for detecting plural sets of frequencies, each set of which includes lock start frequency, lock frequency and lock end frequency, as said frequency of sawtooth waveform is being varied.

In the power supply apparatus in accordance with the present invention, said frequency decision means includes a control device which controls to generate said plural sets of frequencies for each horizontal synchronous pulse train, and compares the sets of frequencies detected at said plural horizontal synchronous pulse train to select the broadest frequency range into which all the plural horizontal synchronous pulse trains can be synchronized.

BRIEF DESCRIPTION OF THE DRAWINGS

FIG. 4 shows the contents of Table 6A;

FIGS. 6 and 7 show the contents of Tables 6B and 6C;

FIG. 8 shows the basic sawtooth waveform and various modified sawtooth waveforms generated by the AFC and FIG. 9 shows the details of the frequency detecting circuit.

DETAILED DESCRIPTION OF PREFERRED EMBODIMENT

Figure 1:
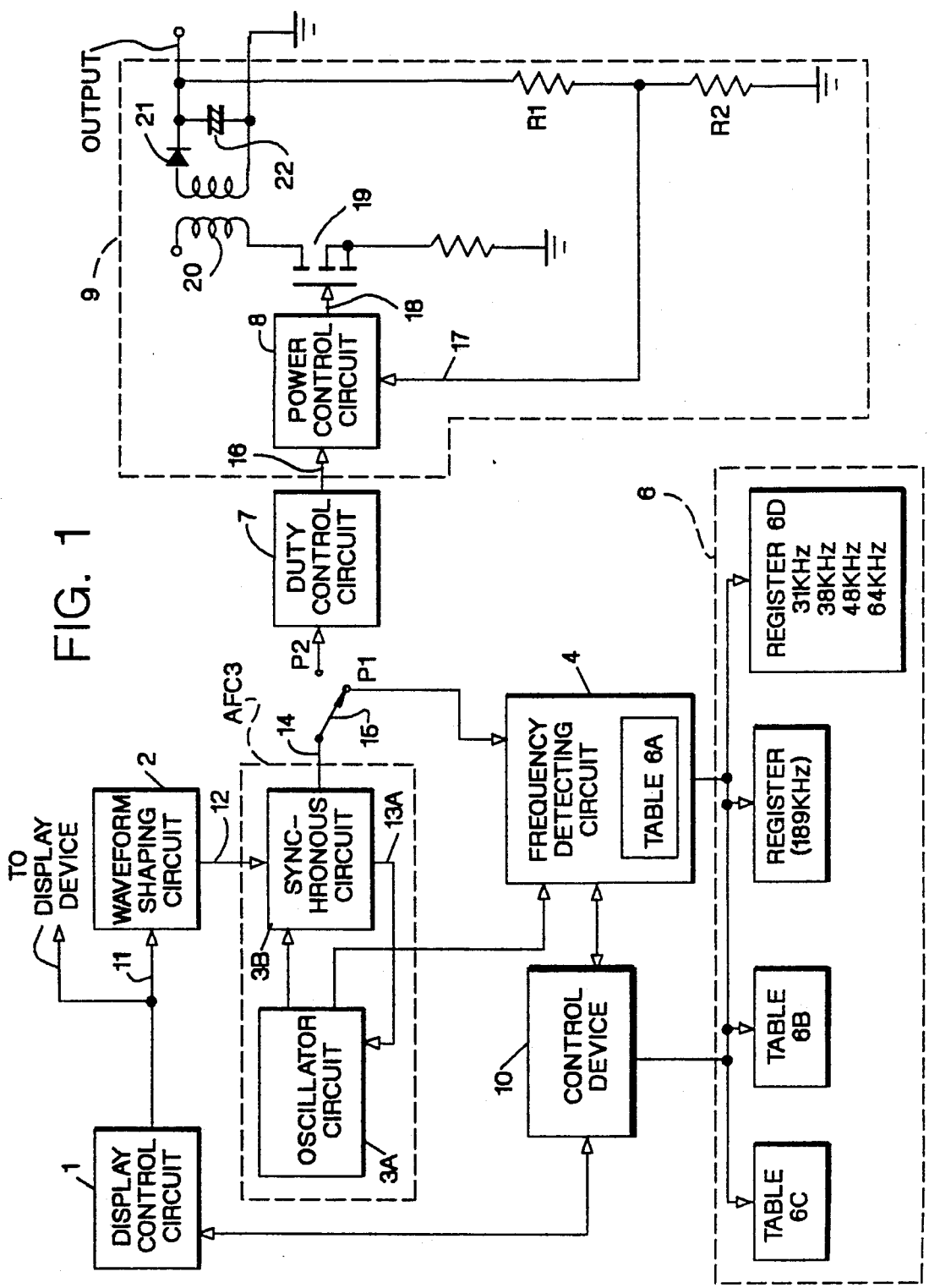
FIG. 1 shows the circuit block diagram of the power supply apparatus in accordance with the present invention.

FIG. 1 shows the power supply apparatus in accordance with the present invention. A display control circuit 1 is included in a personal computer or workstation. The personal computer or workstation control unit has plural character display modes requiring, for example, 640 dots/one horizontal line, 1056 dots/one horizontal line, 1280 dots/one horizontal line; resulting in that plural kinds of horizontal scanning modes are required. A multi-horizontal scan frequency type CRT display device connected to the personal computer or workstation control unit for displaying the plural character display modes has been developed.

The circuit blocks except the display control circuit 1 of the power supply apparatus in the FIG. 1 are mounted in a space within the CRT display device together with a horizontal deflection circuit, a flyback transformer, and other analog circuit, not shown.

The display control circuit 1 is designed to respond to the signal indicating one of character display modes to generate a horizontal synchronous pulse train of frequencies, such as 31 KHz, 38 KHz, 48 KHz or 64 KHz, vertical synchronous pulse trains, and video signals of characters or images to be displayed on the CRT display device.

Figure 2:
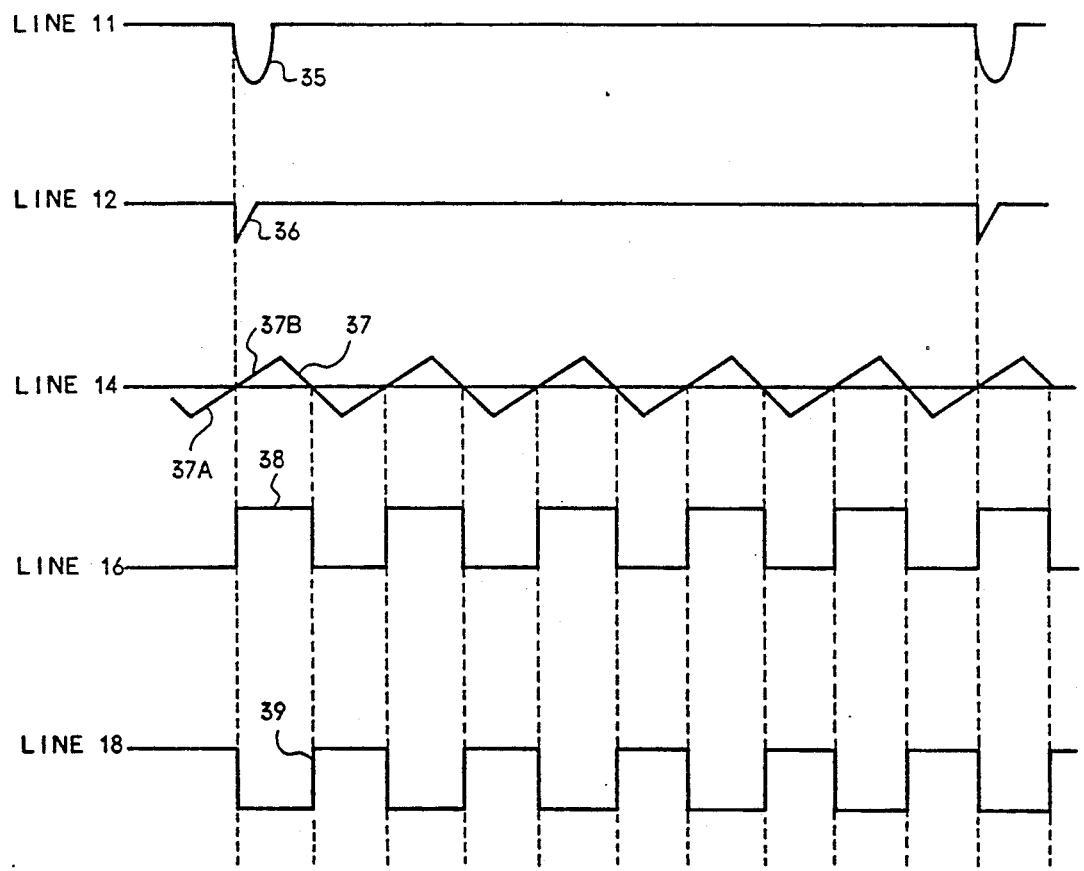
FIG. 2 shows the waveforms at the various connecting points of the circuit shown in the FIG. 1.

The horizontal synchronous pulse train of the selected frequency is supplied to a waveform shaping circuit 2 through a line 11. The horizontal synchronous pulse train 35 on the line 11 is shown in FIG. 2. The waveform shaping circuit 2 generates pulses 36 on a line 12, as shown in the FIG. 2. An automatic frequency control circuit (AFC) 3 includes an oscillator circuit 3A and a synchronous circuit 3B. A sawtooth waveform of a certain frequency generated by the oscillator circuit 3A is modified to a sawtooth waveform 37 of a frequency which is equal to a multiple of the frequency of the horizontal synchronous pulse train applied to the synchronous circuit 3B. To this end, the synchronous circuit 3B generates a feedback signal on a line 13A so as to equalize a lower half 37A of a positive-going portion of the sawtooth waveform, which is separated by a leading edge of the pulse 36, to an upper half 37B of the potion.

In this manner, the AFC 3 modifies the pulses 36 on the line 12 to lock or synchronize a frequency of the sawtooth waveform at the frequency of the horizontal synchronous pulse train, as shown by the wave form 37.

It is assumed that a switch 15 is connected to a position P2 in the FIG. 1. A duty control circuit 7 receives the waveform 37 to generate pulse train 38, as shown in the FIG. 2 on a line 16.

A power control circuit 8 in a switching regulator type power supply circuit 9 receives the pulses 38 on the line 16 and a feedback signal on a line 17 to generate switching pulses on a line 18. A switching element, e.g. a switching transistor 19 is controlled by the pulses on the line 18. The operation of the power control circuit 8, the switching transistor 19, a transformer 20, a diode 21, a capacitor 22, and resistors R1 and R2 is well known in the art, hence the detailed operation is not described.

The circuit blocks 1, 2, 7 and 9 are well known in the art. The circuit blocks 3, 4, 6 and 10 are connected between the waveform shaping circuit 2 and the duty control circuit 7 in accordance with the present invention.

At an initial set-up period, the control device 10 positions the switch 15 to the position P1, and requests from the display control circuit 1 a list of the frequencies of horizontal synchronous (H-SYNC) pulse trains, i.e. 31 KHz, 38 KHz, 48 KHz and 64 KHz, supported by the display control circuit 1. And, the display control circuit 1 informs the control device 10 of the frequencies 31 KHz, 38 KHz, 48 KHz and 64 KHz and these frequencies are stored in a register 6D, as shown by a block 301 in FIG. 3.

The operation proceeds to the block 302 wherein the control device 10 generates frequency values represented by the formulas;

31 KHz×K

38 KHz×K

48 KHz×K

64 KHz×K (wherein K is positive

Figure 5:
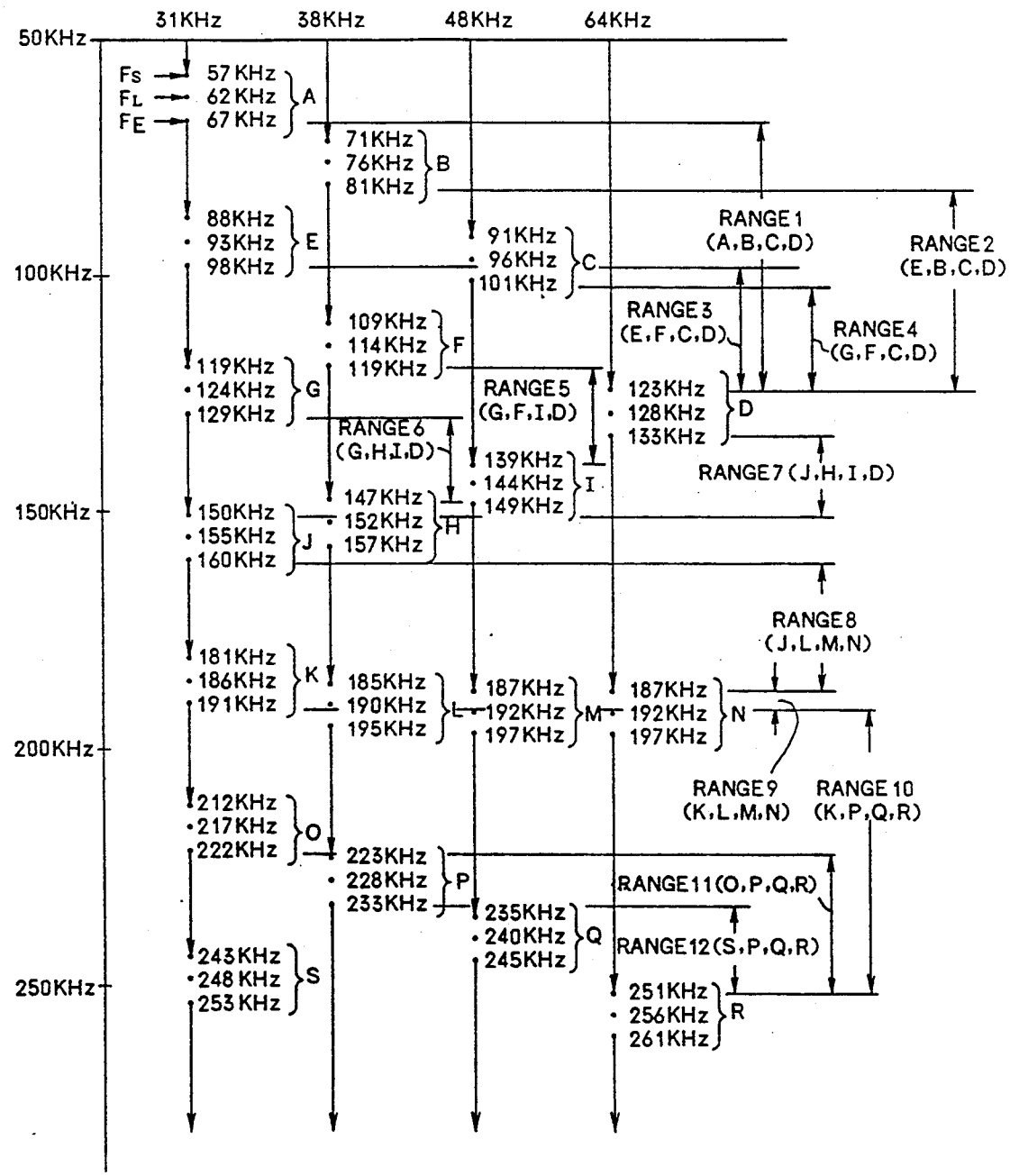
FIG. 5 shows the outputs of the AFC.

And, the control device 10 stores the calculated values in a table 6A in the frequency detecting circuit 4, as shown in FIG. 4. The control device 10 causes the display control circuit 1 to generate Nth, i.e. the first 31 KHz in this case, horizontal synchronous pulse train on the line 11, and causes the variable frequency oscillator circuit 3A to generate the sawtooth waveform in the frequency range of 30 KHz–280 KHz, for example. The sawtooth waveform the frequency of which is gradually increased from 30 KHz is supplied to the synchronous circuit 3B through the line 13, and the horizontal synchronous pulse train of 31 KHz is supplied to the circuit 3B. The output of the AFC 3 is shown in FIG. 5. As the frequency of the sawtooth waveform from the oscillator circuit 3A is increased beyond 57 KHz, the AFC 3 synchronizes its oscillating frequency to 62 KHz which is twice of the horizontal synchronous frequency, and its output frequency is locked to 62 KHz since the pull-in range of this case is set to be ±5 KHz. The lock of the output frequency is released before 67 KHz. The 57 KHz frequency is called as a lock start frequency $F_S$, the 67 KHz frequency is called as a lock frequency $F_L$, and the 67 KHz frequency is called as a lock end frequency $F_E$ in this specification.

As the frequency of the sawtooth waveform is further increased from the 67 KHz, the lock of the frequency is happened at 93 KHz, 124 KHz, 155 KHz, 186 KHz, 217 KHz and 248 KHz, as shown in the FIG. 5. In a block 303 in the FIG. 3, the frequencies $F_S$, $F_L$ and $F_E$ for each locked frequency are detected or discriminated by the frequency detecting circuit 4 and are supplied to the control device 10, which stores them in the table 6B, as shown in FIG. 6.

Figure 3:
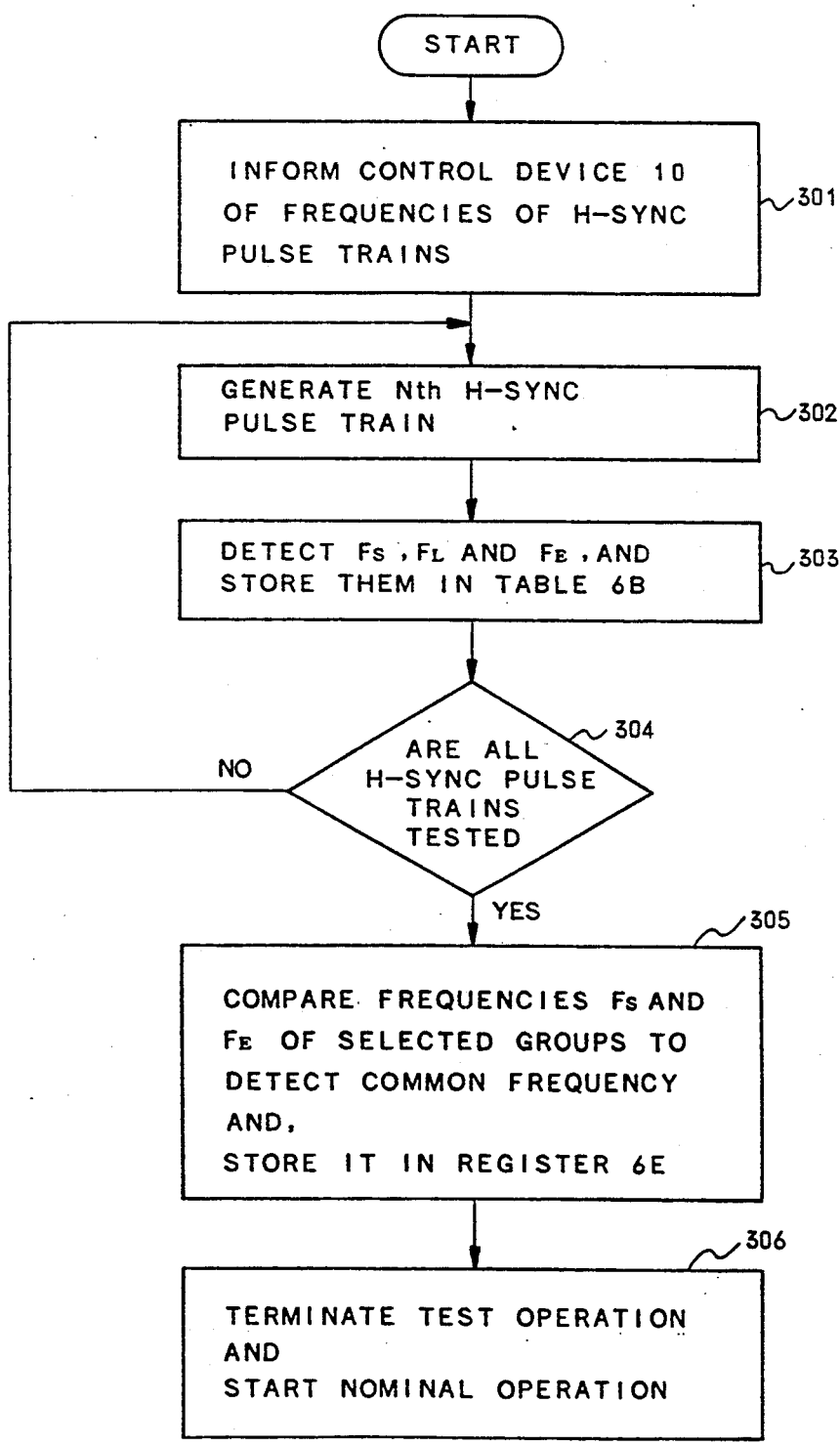
FIG. 3 shows the flow chart of the operation performed by the circuit shown in the FIG. 1.

The operation proceeds to a block 304 in the FIG. 3, wherein the control device 10 checks as to whether all the frequencies of the horizontal synchronous pulse train have been tested, or not. In this case, the answer of the block 304 is NO, the operation is returned to the block 302 wherein the control device 10 causes the display control circuit 1 to generate the second horizontal synchronous frequency 38 KHz. In the same manner as that of the 31 KHz case, the frequencies $F_S$, $F_L$ and $F_E$ are detected by the frequency detecting circuit 4 and the detected values are stored in the table 6B, as shown in the FIG. 6. In this manner, the frequencies $F_S$, $F_L$ and $F_E$ for the horizontal synchronous frequencies 48 KHz and 64 KHz are detected and stored in the table 6B. After the frequencies $F_S$, $F_L$ and $F_E$ for the last horizontal synchronous frequency 64 KHz have been stored in the table 6B, the answer of the block 304 becomes YES.

The operation proceeds to a block 305 in the FIG. 3, wherein the control device 10 selects a group of values at the horizontal synchronous frequencies 31 KHz, 38 KHz, 48 KHz and 64 KHz, and compares a group of lock frequencies $F_S$ at 31 KHz, 38 KHz, 48 KHz and 64 KHz, and compares a group of lock end frequencies $F_E$ at 31 KHz, 38 KHz, 48 KHz and 64 KHz, to detect a common or basic frequency in the selected group.

Referring to the FIG. 5, the control device 10 initially selects the values A, B, C and D as the first group; compares the lock end frequencies 67 KHz, 81 KHz, 101 KHz and 133 KHz of the values A, B, C and D to select the lowest lock end frequency 67 KHz, compares the lock start frequencies 57 KHz, 71 KHz, 91 KHz and 123 KHz of the values A, B, C and D to select the highest lock start frequency 123 KHz; and stores the frequency −56 KHz in the frequency range 1 in a table 6C in FIG. 7, which is the difference by subtracting the maximum lock start frequency ($F_S$ max) 123 KHz from the minimum lock end frequency ($F_E$ min) 67 KHz.

Next, the control device 10 selects the values E, B, C and D as the second group; compares the lock end frequencies 98 KHz, 81 KHz, 101 KHz and 133 KHz of the values E, B, C and D to select the lowest lock end frequency 81 KHz; compares the lock start frequencies 88 KHz, 71 KHz, 91 KHz and 123 KHz of the values E, B, C and D to select the highest lock start frequency 123 KHz; and stores the value −42 KHz=81 KHz ($F_E$ min)−123 KHz ($F_S$ max) in the range 2 in the Table 6C shown in the FIG. 7.

Next, the control device 10 selects the values E, F, C and D as the third group; compares the lock end frequencies 98 KHz, 119 KHz, 101 KHz and 133 KHz of the values E, F, C and D to select the lowest lock end frequency 98 KHz; compares the lock start frequencies 88 KHz, 109 KHz, 91 KHz and 123 KHz of the values E, F, C and D to select the highest lock start frequency 123 KHz; and stores the value −25 KHz, between the lowest lock end frequency 98 KHz and the highest lock start frequency 123 KHz in the range 3 in the table 6C in the FIG. 7.

In this manner, the control device 10 sequentially calculates the values of the following ranges and stores them in the table 6C in the FIG. 7.

Range 4 (−22 KHz): Values G, F, C and D
Range 5 (−20 KHz): Values G, F, I and D
Range 6 (−18 KHz): Values G, H, I and D
Range 7 (−17 KHz): Values J, H, I and D
Range 8 (−27 KHz): Values J, L, M and N
Range 9 (+4 KHz) : Values K, L, M and N
Range 10 (−70 KHz): Values K, P. Q and R
Range 11 (−29 KHz): Values 0, P, Q and R
Range 12 (−18 KHz): Values S, P, Q and R And, the control device 10 compares the values of the frequency ranges 1 through 12 in the table 6C in the FIG. 7 and selects the range 9 which has the positive maximum value 4 KHz. It is noted that the broadest range 9 includes the frequency from 187 KHz to 191 KHz and the common lock frequency does exist in the case that the condition $F_E$ min−$F_S$ max>0 is satisfied. The control device 10 selects an intermediate frequency 189 KHz in the range 9 as a common or basic frequency of the broadest range 9, and stores the frequency 189 KHz in a register 6E.

The basic frequency 189 KHz can be locked or synchronized to the multiples of all the horizontal synchronous frequencies in the range 9. That is, the AFC 3 can synchronize to the multiples of all the horizontal synchronous frequencies in the range 9.

The operation proceeds to a block 306 in the FIG. 3 wherein the control device 10 terminates the test period, and starts the display operation by positioning the switch 15 to the position P2 shown in the FIG. 1.

In the normal operation, the control device 10 uses the common or basic frequency, i.e. 189 KHz, stored in the register 6E shown in the FIG. 1 to control the frequency of the oscillator circuit 3A. That is, the frequency of the oscillator circuit 3A is fixed to the common or basic frequency 189 KHz in the normal operation. The frequency 189 KHz is modified to synchronize to the multiples of the horizontal synchronous frequencies.

Figure 8:
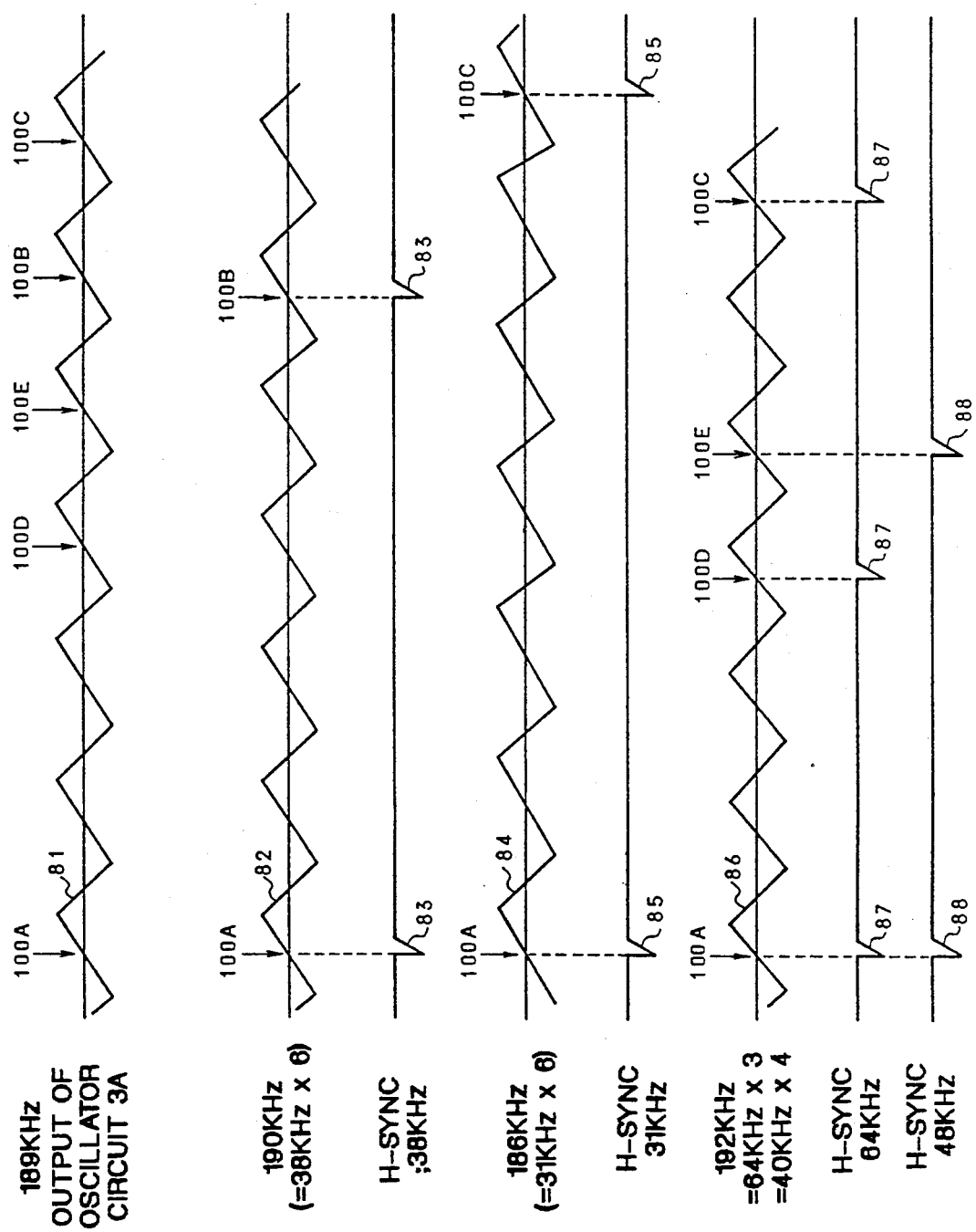

FIG. 8 shows the sawtooth waveform 81 of the basic frequency 189 KHz generated by the oscillator circuit 3A and applied to the synchronous circuit 3B, and various sawtooth waveforms of the frequencies shifted or modified from the 189 KHz depending upon the frequency of the horizontal synchronous pulse train, i.e. 31

KHz, 38 KHz, 48 KHz or 64 KHz, applied from the display control circuit 1 through the waveform shaping circuit 2.

When the display control circuit 1 supplies the horizontal synchronous (H-SYNC) pulse train 83 of 38 KHz for the character display mode requiring 1056 dots/one horizontal line to the AFC 3 through the waveform shaping circuit 2, the AFC 3 automatically locks the frequency of the sawtooth waveform 81 to the frequency 190 KHz (=38 KHz×5) to generate the sawtooth waveform 82. That is, the AFC 3 modifies the sawtooth waveform 81 to the sawtooth waveform 82 so that the leading edges of the horizontal synchronous pulses 83 align with the middle points 100A and 100B of the positive-going portions of the sawtooth waveform 81, respectively.

The sawtooth waveform 82 of the frequency 190 KHz is supplied to the duty control circuit 7 through the switch 15 at the position P2. The duty control circuit 7 and the power control circuit 8 generate the switching pulses 39, as shown in the FIG. 2, of the frequency 190 KHz for controlling the switching transistor 19 of the switching regulator.

When the display control circuit 1 supplies the horizontal synchronous pulses 85 of 31 KHz for the character display mode requiring 640 dots/one horizontal line to the AFC 3 through the waveform shaping circuit 2, the AFC 3 automatically locks the frequency of the sawtooth waveform 81 to the frequency 186 KHz (=31 KHz×6) to generate the sawtooth waveform 84. That is, the AFC 3 modifies the sawtooth waveform 81 to the sawtooth waveform 84 so that the leading edges of the horizontal synchronous pulses 85 align with the middle points 100A and 100C of the positive-going portions of the sawtooth waveform 81, respectively.

The sawtooth waveform 84 of the frequency 186 KHz is supplied to the duty control circuit 7 through the switch 15 at the position P2. The duty control circuit 7 and the power control circuit 8 generate the switching pulses of the frequency 186 KHz for controlling the switching transistor 19 of the switching regulator.

When the display control circuit 1 supplies the horizontal synchronous pulse train 87 of 64 KHz for the character display mode requiring 1280 dots/one horizontal line to the AFC 3 through the waveform shaping circuit 2, the AFC 3 automatically locks the frequency of the sawtooth waveform 81 to the frequency 192 KHz (=64 KHz×3) to generate the sawtooth waveform is, the AFC 3 modifies the sawtooth waveform 81 to the sawtooth waveform 86 so that the leading edges of the horizontal synchronous pulses 87 align with the middle points 100, 100D and 100C of the positive-going portions of the sawtooth waveform 81, respectively.

The sawtooth waveform 86 of the frequency 192 KHz is supplied to the duty control circuit 7 through the switch 15 at the position P2. The duty control circuit 7 and the power control circuit 8 generate the switching pulses of the frequency 192 KHz for controlling the switching transistor 19 of the switching regulator.

When the display control circuit 1 supplies the horizontal synchronous pulse train 88 of 48 KHz for the character display mode requiring 1056 dots/one horizontal line to the AFC 3 through the waveform shaping circuit 2, the AFC 3 automatically locks the frequency of the sawtooth waveform 81 to the frequency 192 KHz (=48 KHz×4) to generate sawtooth waveform 86.

That is, the AFC 3 modifies the sawtooth waveform 81 to the sawtooth waveform 86 so that the leading edges of the horizontal synchronous pulses 88 align with the middle points 100 and 100E of the positive-going portions of the sawtooth waveform 81, respectively.

The sawtooth waveform 86 of the frequency 192 KHz is supplied to the duty control circuit 7 through the switch 15 at the position P2. The duty control circuit 7 and the power control circuit 8 generate the switching pulses of the frequency 192 KHz for controlling the switching transistor 19 of the switching regulator.

As apparent from the above description, the power supply apparatus in accordance with the present invention generates the switching pulses of the frequency 186 KHz, 190 KHz and 192 KHz in response to the horizontal synchronous pulse trains of the frequencies 31 KHz, 38 KHz, 48 KHz and 64 KHz, respectively; and these frequencies of the switching pulses for the switching regulator are fallen into very narrow range, i.e. 192 $KHz - 186\ KHz = 6\ KHz$.

Comparing the 6 KHz covering 31 KHz, 38 KHz, 48 KHz and 64 KHz realized by the present invention with the 51 KHz range covering only 31 KHz and 48 KHz described hereinbefore in the description of prior art, it is apparent that the range of the switching frequencies supplied to the switching regulator can be remarkably narrowed by the present invention. It is noted that the narrower the range of the switching frequencies is, the easier is the design of the power supply circuit since the following parameters depend upon the range of the switching frequencies; and the higher is the total operational efficiency of the power supply device.

The typical parameters are:

Core size of the switching transformer 20;

Switching speed range of the rectifying diode 21;

Capacitance and size of the smoothing capacitor 22, and

Design of heat reduction of circuit components.

The embodiment of the power supply apparatus in accordance with the present invention selectively generates four horizontal synchronous pulse trains of 31 KHz, 38 KHz, 48 KHz and 64 KHz, and generates the switching pulses of 186 KHz for the horizontal synchronous pulse train of 31 KHz, the switching pulses of 190 KHz for the horizontal synchronous pulse train of 38 KHz, the switching pulses of 192 KHz for the horizontal synchronous pulse trains of 48 KHz and 64 KHz, respectively. The multiplier 6 for the 31 KHz, the multiplier 5 for the 38 KHz, the multiplier 4 for the 48 KHz and the multiplier 3 for the 64 KHz are selected to provide the narrowest switching frequency range, i.e. the 6 KHz range. The selection of the switching frequency range is performed by the operation in the block 305 in the FIG. 3.

Describing the case wherein the display control circuit has two horizontal synchronous modes of 31 KHz and 38 KHz, with referring the FIG. 5, the operation in the block 305 in the FIG. 3 selects the switching frequency 155 KHz for the 31 KHz horizontal synchronous pulse train and the switching frequency 152 KHz for the 38 KHz horizontal synchronous pulse train since the range 157 KHz−150 KHz=7 KHz is the broadest common lock range among the ranges for the horizontal synchronous pulse trains of 31 KHz and 38 KHz, as apparent from the FIG. 5.

And, a basic frequency 153.5 KHz is selected, and modified to 155 KHz for 31 KHz and 152 KHz for 38

KHz. The basis frequency 153.5 KHz is stored in the register 6E as the frequency used for this particular combination of the horizontal synchronous pulse trains. The frequency 155 KHz of the switching pulses is N times (N is a positive integer, and N=5) as large as the frequency 31 KHz of the horizontal synchronous pulse train, and the frequency 152 KHz of the switching pulses is M times (M is a positive integer, and M=4) as large as the frequency 38 KHz of the horizontal synchronous pulse train. And, the multipliers, N=5 and M=4 are selected to provide the narrowest switching frequency range, i.e. 3 KHz.

It is noted that the reasons for selecting the broadest range 9 which has the positive maximum value are to give a large tolerance against the shift of the basic frequency due to the influence of temperature variation, whereby the stability of the power supply apparatus is remarkably increased. The wider the range 9, i.e. 4 KHz, is, the narrower is the resultant switching frequency range, i.e. 6 KHz, of the switching regulator type power supply circuit.

As described above, the frequencies, i.e. 31 KHz, 38 KHz, 48 KHz and 64 KHz of the horizontal synchronous pulse trains are stored in the register 6D in the initial set-up period, and the basic frequency 189 KHz for this particular combination of the horizontal synchronous pulse trains is selected and stored in the register 6E.

It is noted that the basic frequency is selected depending upon the combination of the horizontal synchronous frequencies. Therefore, the control device 10 determines for each initial set-up period whether the frequencies of the horizontal synchronous pulse trains given from the display control circuit 1 are equal to the frequencies stored in the register 6D. It is assumed that the frequencies stored in the register 6D are 31 KHz, 38 KHz, 48 KHz and 64 KHz, and the frequency in the register 6E is 189 KHz, and a newly connected display control circuit 1 generates 31 KHz and 38 KHz, as described above. In this case, the old combination of 31 KHz, 38 KHz, 48 KHz and 64 KHz differs from the new combination of 31 KHz and 38 KHz. The control device 10, therefore, resets the old values in the registers 6D and 6E, and initiates the test operation shown in the FIG. 3 to find out the new value 153.5 KHz for the new combination of 31 KHz and 38 KHz. The old value, i.e. 189 KHz in the register 6E is replaced by the new value, 153.5 KHz, and the old values 31 KHz, 38 KHz, 48 KHz and 64 KHz in the register 6D are replaced by the new values 31 KHz and 38 KHz.

In this manner, the control device 10 determines in the initial set-up period whether the frequencies of the horizontal synchronous pulse trains given from the display control circuit 1 are equal to the frequencies stored in the register 6D. If YES, the control device 10 uses the frequency stored in the register 6E as the basic frequency without initiating the new test operation. If NO, the control device 10 resets the values in the registers 6D and 6E, and initiates the test operation to find out the new basic frequency for the new combination of the horizontal synchronous frequencies.

FIG. 9 shows the details of the frequency detecting circuit 4 shown in the FIG. 1, which includes a comparing circuit 41, a register 42, gates 43 and 44 and a logic circuit 45. Describing the operation of the circuit 4 by using the case of the 31 KHz horizontal synchronous frequency shown in the FIG. 5, the oscillator circuit 3A gradually increases the frequency of the sawtooth waveform on the line 13 in the test period, as described hereinbefore. The oscillator circuit 3A also supplies a signal indicating the frequency to the register 42 through a line 46. When the frequency exceeds 57 KHz, as shown in the FIG. 5, the frequency of the sawtooth waveform on the output line 14 of the AFC 3 is locked or synchronized to 62 KHz. This locked condition is detected by the comparing circuit 41. More particularly, the multiples 62 KHz, 93 KHz, 124 KHz, 155 KHz, 186 KHz, 217 KHz and 248 KHz of 31 KHz stored in the Table 6A of the FIG. 4 are sequentially compared with the output frequency on the line 14 from the AFC 3. When the output frequency is equal to 62 KHz, the comparing circuit 41 generates a gate pulse on a line 47. At this time, the register 42 stores a history frequency, i.e. 57 KHz in this case. The frequency 62 KHz is also supplied to the gate 43 through a line 48. Both the lock start frequency ($F_S$) 57 KHz and lock frequency ($F_L$) 62 KHz are supplied to the logic circuit 45 by the gate pulse on the line 47. The logic circuit 45 calculates the lock end frequency $F_E$ 67 KHz by using the formula $F_E = F_L + (F_L - F_S)$, and supplies the frequencies $F_S$, $F_L$ and $F_E$ to the control device 10, which stores these frequencies in the Table 6B shown in the FIG. 6. The same operation as that described above is performed when the frequency of the oscillator circuit 3A exceeds each of the lock start frequencies ($F_S$) 88 KHz, 119 KHz, 150 KHz, 181 KHz, 212 KHz and 243 KHz, respectively, and the Table 6B in the FIG. 6 is completed.

EFFECTS PERFORMED BY THE INVENTION

In accordance with the present invention, the power supply apparatus can be operated at the high frequency up to several times of plural horizontal synchronous frequencies, and also be synchronized to the plural horizontal synchronous frequencies.

Since the closest multiples ($F_L$) each the formula $F_L = F_H \times N$ ($F_L$ is the frequency of the horizontal synchronous pulse train, and N is a positive integer) are selected, the required operational range of the connected power supply circuit can be minimized, whereby the several key design parameters, as stated hereinbefore can be selected to optimize the operational condition for all the horizontal synchronous pulse trains. Moreover, the total efficiency of the power supply apparatus can be remarkably improved and its size can be reduced since the switching frequency is relatively high.

We claim:

1. Power supply apparatus comprising:
    first means for selectively generating at least two horizontal synchronous pulse trains of different frequencies;
    second means connected to said first means for generating a first switching pulse train of a frequency which is N times as large as the frequency of one horizontal synchronous pulse train (N is a positive integer) a second switching pulse train of a frequency which is M times as large as the frequency of the other horizontal synchronous pulse train (M is a positive integer) with said N and M being selected to provide a narrowest switching frequency range; and
    power supply means of switching regulator type connected to said second means, which operates in the switching frequency range defined by said first and second switching pulse trains.

2. Power supply apparatus according to claim 1, wherein said first means is a display control circuit which selectively generates first horizontal synchronous pulse train of first frequency and second horizontal synchronous pulse train of second frequency.

3. Power supply apparatus according to claim 2, wherein said second means includes an oscillator circuit for generating sawtooth waveform of a predetermined frequency, and a synchronous circuit receiving said sawtooth waveform and one of said first and second horizontal synchronous pulse train to modify said predetermined frequency to frequency which is N times as large as the frequency of first horizontal synchronous pulse train or frequency which is M times as large as the frequency of the second horizontal synchronous pulse train.

4. Power supply apparatus comprising:
   first means for selectively generating one of plural horizontal synchronous pulse trains of different frequencies;
   frequency decision means for responding to information which indicates said frequencies of plural horizontal synchronous pulse trains, to select a broadest frequency range into which all the plural horizontal synchronous pulse trains can be synchronized, and to select a basic frequency included in a narrowest frequency range;
   second means operating at said basic frequency and responding to one of said frequencies of plural horizontal synchronous pulse trains to generate one of plural switching pulse trains which are equal to multiples of said frequencies of plural horizontal synchronous pulse trains, respectively; and
   power supply means of switching regulator type connected to said second means, which operates in a switching frequency range defined by said frequencies equal to said multiples.

5. Power supply apparatus according to claim 4, wherein said frequency decision means includes an oscillator circuit varying a frequency of sawtooth waveform, a synchronous circuit connected to said oscillator circuit and receiving one of said plural horizontal synchronous pulse trains of different frequencies, and a frequency detecting circuit connected to said oscillator circuit and said synchronous circuit for detecting plural sets of frequencies, each set of which includes lock start frequency, lock frequency and lock end frequency, as said frequency of sawtooth waveform is being varied.

6. Power supply apparatus according to claim 5, wherein said frequency decision means includes a control device to generate said plural sets of frequencies for each horizontal synchronous pulse train, and compares the sets of frequencies detected at said plural horizontal synchronous pulse train to select the broadest frequency range into which all the plural horizontal synchronous pulse trains can be synchronized.

7. A circuit arrangement for controlling the switching frequencies of a power supply comprising:
   first means for selectively generating at least two horizontal synchronous pulse trains of different frequencies;
   second means connected to said first means for generating a first switching pulse train of a frequency which is N times as large as the frequency of one horizontal synchronous pulse train (N is a positive integer) and a second switching pulse train of a frequency which is M times as large as the frequency of the other horizontal synchronous pulse train (M is a positive integer) with said N and M being selected to provide a narrowest switching frequency range.

8. In a display system having a multimode character display and a power supply for driving said multimode character display, a circuit arrangement for controlling the switching frequencies of said power supply comprising:
   first means for selectively generating one of plural horizontal synchronous pulse trains of different frequencies;
   frequency decision means for responding to information which indicates said frequencies of plural horizontal synchronous pulse trains, to select a broadest frequency range into which all the plural horizontal synchronous pulse trains can be synchronized, and to select a basic frequency included in a narrowest frequency range;
   second means operating at said basic frequency and responding to one of said frequencies of plural horizontal synchronous pulse train to generate one of plural switching pulse trains which are equal to multiples of said frequencies of plural horizontal synchronous pulse trains, respectively.

* * * * *